United States Patent
Gao et al.

(10) Patent No.: US 12,411,701 B2
(45) Date of Patent: Sep. 9, 2025

(54) INTERFACE GENERATION SYSTEM AND INTERFACE GENERATION METHOD

(71) Applicants: DIGIWIN CO., LTD., Shanghai (CN); DATA SYSTEMS CO., LTD., New Taipei (TW)

(72) Inventors: Yihai Gao, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 96 days.

(21) Appl. No.: 18/461,532

(22) Filed: Sep. 6, 2023

(65) Prior Publication Data

US 2025/0004798 A1    Jan. 2, 2025

(30) Foreign Application Priority Data

Jun. 30, 2023    (CN) .......................... 202310800082.7

(51) Int. Cl.
*G06F 9/451* (2018.01)
*G06F 3/048* (2013.01)

(52) U.S. Cl.
CPC .................................. *G06F 9/451* (2018.02)

(58) Field of Classification Search
CPC . G06F 9/44; G06F 9/449; G06F 9/451; G06F 9/44584; G06F 9/44521
See application file for complete search history.

(56) References Cited

U.S. PATENT DOCUMENTS

| | | | | |
|---|---|---|---|---|
| 6,519,571 | B1 * | 2/2003 | Guheen .............. | G06Q 30/0269 705/14.66 |
| 6,721,713 | B1 * | 4/2004 | Guheen ................. | G06Q 99/00 715/202 |
| 10,775,976 | B1 * | 9/2020 | Abdul-Jawad ............ | G06F 9/54 |
| 10,891,127 | B2 * | 1/2021 | Ye ......................... | G06F 16/148 |
| 2006/0236254 | A1 * | 10/2006 | Mateescu .................. | G06F 8/75 715/762 |
| 2008/0301643 | A1 * | 12/2008 | Appleton ............... | G06Q 30/02 717/124 |
| 2017/0083585 | A1 * | 3/2017 | Chen .................... | G06F 11/3409 |
| 2017/0090734 | A1 * | 3/2017 | Fitzpatrick ............ | G06F 3/0486 |
| 2021/0342785 | A1 * | 11/2021 | Mann .................... | G06F 40/186 |

* cited by examiner

*Primary Examiner* — Nicholas Augustine
(74) *Attorney, Agent, or Firm* — JCIPRNET

(57) ABSTRACT

An interface generation system and an interface generation method are provided. A processor executes a design module, an analysis module, a metadata module, and a rendering module. The design module receives configuration data. The metadata module calls metadata according to an application program interface (API) corresponding to the configuration data and stores the metadata of a plurality of APIs. The analysis module analyzes the configuration data and the metadata to generate interface data according to the metadata of the APIs and a data feature. The rendering module displays interface content on a display according to the interface data to provide an operation interface and a data interface corresponding to the configuration data.

14 Claims, 5 Drawing Sheets

INTERFACE GENERATION SYSTEM AND INTERFACE GENERATION METHOD

CROSS-REFERENCE TO RELATED APPLICATION

This application claims the priority benefit of China application serial no. 202310800082.7, filed on Jun. 30, 2023. The entirety of the above-mentioned patent application is hereby incorporated by reference herein and made a part of this specification.

BACKGROUND

Technical Field

The disclosure relates to an interface generation and interface configuration technology, and in particular, to an interface generation system and an interface generation method.

Description of Related Art

In the development of enterprise management software, a large number of developers are needed, so as to develop interfaces featuring multiple functions and interactive functions. The interactive functions may be the input of basic data, the selection of pop-up windows, the characteristic of data fields and so on. Therefore, in the currently-available methods, developers are required to design and develop interfaces one by one according to users' needs. This results in tremendous labor costs and time costs, and the content of the interfaces cannot be adjusted in real time according to users' needs. Therefore, how to efficiently generate a corresponding interface according to user operations is an important issue.

SUMMARY

The disclosure provides an interface generation system and an interface generation method capable of generating an interface according to configuration data and metadata and implementing an interface generation function with low error rate and high efficiency.

According to an embodiment of the disclosure, the disclosure provides an interface generation system including a storage device and a processor. The storage device stores a design module, an analysis module, a metadata module, and a rendering module. The processor is coupled to the storage device and executes the design module, the analysis module, the metadata module, and the rendering module. The design module receives configuration data, so that the metadata module stores metadata of a plurality of application programming interfaces (APIs) according to the configuration data. The analysis module analyzes the configuration data and the metadata to generate interface data. The rendering module displays an interface on a display according to the interface data.

According to an embodiment of the disclosure, the disclosure further provides an interface generation method, and the method includes the following steps. A design module receives configuration data. A metadata module stores metadata of a plurality of application programming interfaces (APIs) according to the configuration data. An analysis module analyzes the configuration data and the metadata to generate interface data. A rendering module displays interface content on a display according to the interface data.

To sum up, in the interface generation system and the interface generation method provided by the disclosure, through the configuration data and the source data of the APIs, the operation interface related to the plurality of APIs is effectively established according to the configuration data and the extraction rule, so as to be conveniently operated and used by users.

To make the aforementioned more comprehensible, several embodiments accompanied with drawings are described in detail as follows.

DESCRIPTION OF THE EMBODIMENTS

Figure 1:
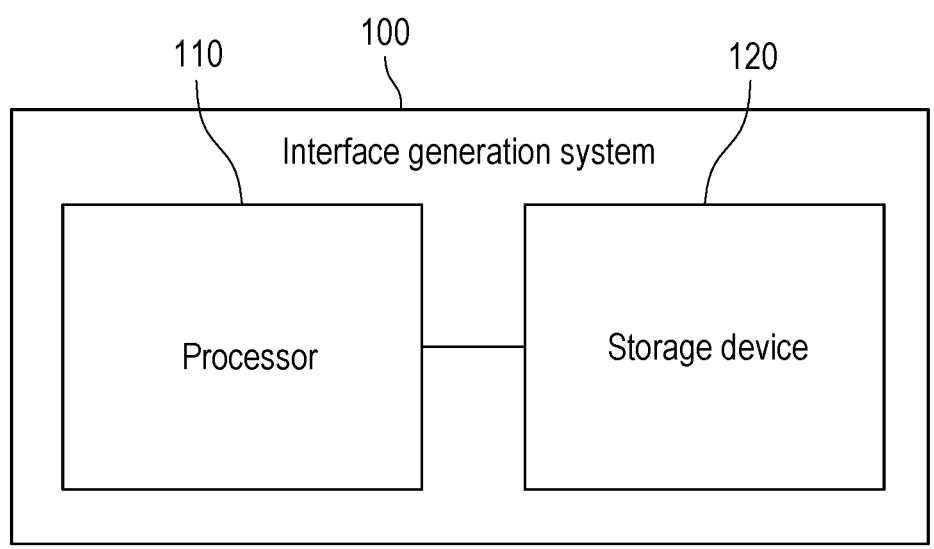
FIG. 1 is a schematic view of an interface generation system according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a schematic view of an interface generation system according to an embodiment of the disclosure. With reference to FIG. 1, an interface generation system 100 includes a processor 110 and a storage device 120. The processor 110 may include, for example, a central processing unit (CPU) or a programmable microprocessor for general or special use, a digital signal processor (DSP), an application specific integrated circuit (ASIC), a programmable logic device (PLD), other similar processing circuits, or a combination of the foregoing devices.

Figure 2:
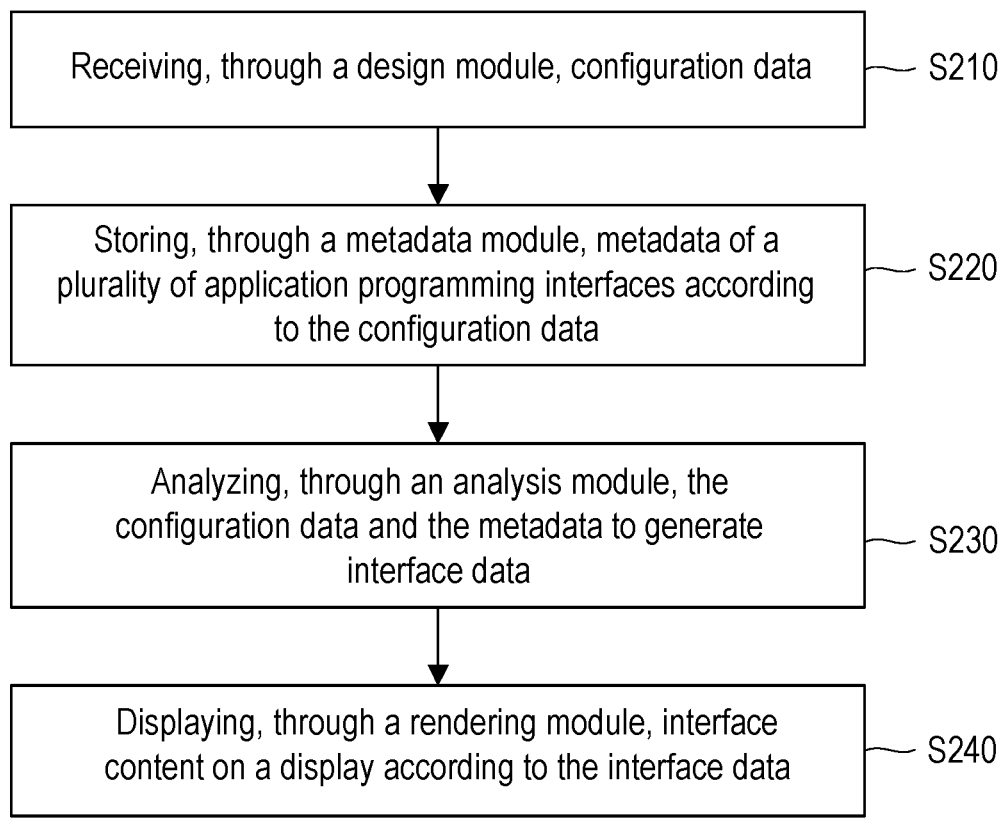
FIG. 2 is a flow chart of an interface generation method according to an embodiment of the disclosure.
Figure 3:
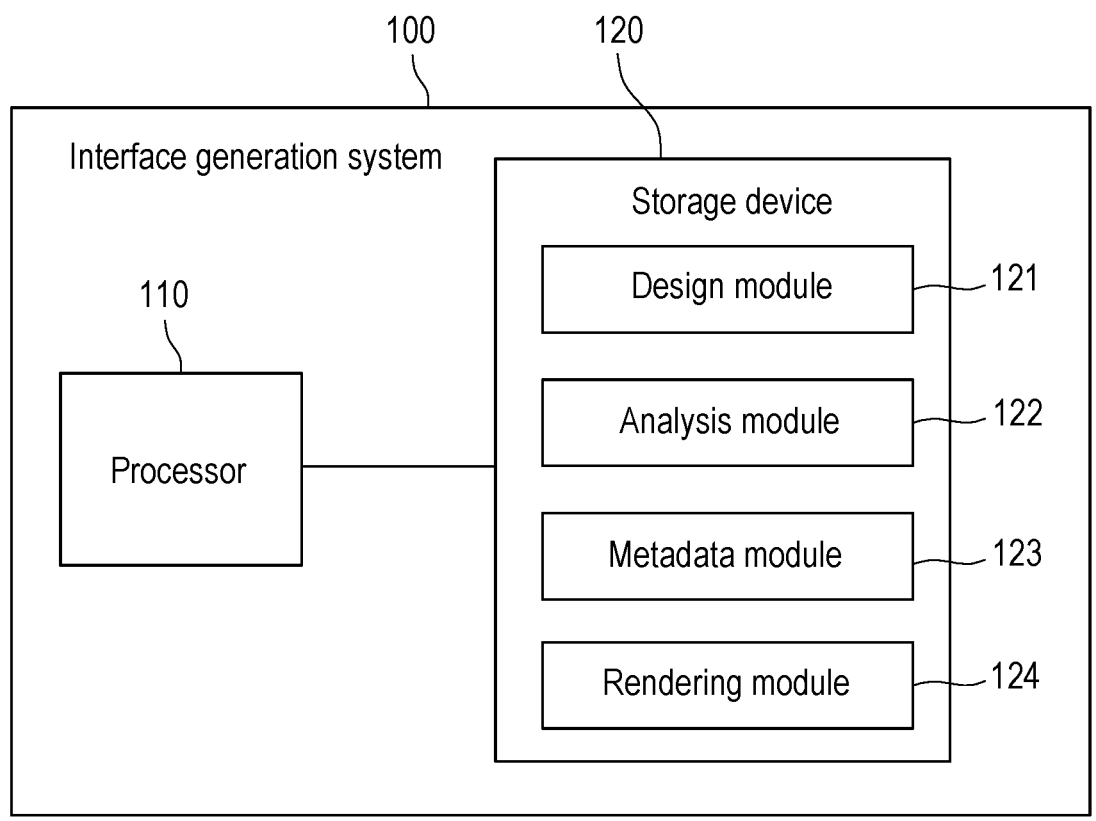
FIG. 3 is a schematic view of the interface generation system executing a plurality of modules according to an embodiment of the disclosure.

FIG. 2 is a flow chart of an interface generation method according to an embodiment of the disclosure. FIG. 3 is a schematic view of the interface generation system executing a plurality of modules according to an embodiment of the disclosure. With reference to FIG. 1, FIG. 2, and FIG. 3, the interface generation system 100 may execute the following steps S210 to S240 to effectively generate a corresponding interface according to user configuration. In this embodiment, the storage device 120 stores a design module 121, an analysis module 122, a metadata module 123, and a rendering module 124. In this embodiment, the design module 121, the analysis module 122, the metadata module 123, and the rendering module 124 may be matched with corresponding data transmission interfaces and/or data processing modules to implement their respective functions through corresponding software and/or programs.

In this embodiment, a user may input configuration data related to an application programming interface (API) by operating the interface generation system 100 or an input device (e.g., an electronic apparatus or a keyboard), so that the interface generation system 100 calls the API according to the configuration data. The interface generation system 100 creates related interface data according to a calling result (i.e., calling information) and the configuration data.

In this way, the interface generation system 100 may generate an interface operation system corresponding to user settings by inputting the configuration data and the interface data into a display. Besides, the API may be, for example, a cloud application service provided by a server or a database or a cloud business application service provided by another cloud server, which is not limited by the disclosure.

In step S210, the processor 110 executes the design module 121, so that the design module 121 receives configuration data. In an embodiment, the user may input the configuration data into the interface generation system 100 through an input apparatus (e.g., an operation interface) or a communication device (e.g., a transceiver). The configuration data has setting parameters related to the use of the API, such as a name, a type, request content, and an extraction rule of at least one application program interface. In other words, the configuration data may include API-related data such as an API URL, an API type, an API feature, and an API parameter. The type of the API may be, for example, "purchase requisition to purchase service" or "purchase change service", but the disclosure is not limited thereto. In this embodiment, the extraction rule is configured with a predefined algorithm and is used to describe how to extract required data from the calling information of the API. The algorithm may be, for example, JavaScript Object Notation (JSON) algorithm, but the disclosure is not limited thereto. The extraction rule may describe the position of the information in the request information and/or the response information.

In an embodiment, the configuration data includes submit data configuration and query data configuration. The design module 121 calls a corresponding API according to the submitted data in the configuration data and then obtains corresponding response information. In this way, the design module 121 may treat the response information as the submitted data in the configuration data and store the response information in the storage device 120. That is, the submitted data in the configuration data may be the data called/read from the corresponding API according to the query data.

In step S220, the processor 110 executes the metadata module 123, so that the metadata module 123 stores metadata of a plurality of APIs according to the configuration data. To be specific, the metadata module 123 calls the related APIs according to the configuration data and stores the metadata of the APIs. The metadata of the APIs includes a data name, a data type (e.g., character strings and values), and a data feature. The data feature may be a required feature, an optional feature (that is, not required), whether it is a business primary key, and whether it is a primary key. The primary key refers to whether the data or value is a unique and complete key that identifies data or attributes. One data table can only have one primary key, such as number. The business primary key is unique data from the business level. The business primary key may be, for example, order number, employee number, product number, etc. The processor 110 may perform different data query logic processing according to different data types.

In step S230, the analysis module 122 analyzes the configuration data and the metadata to generate interface data. The interface data includes interface structure data and display data (i.e., numerical value or text to be presented). In an embodiment, the analysis module 122 serializes the interface data and outputs the serialized interface data to the rendering module 124. Serialization may be that the analysis module 122 performs organization and arrangement according to the data feature of the metadata. For instance, the analysis module 122 displays the data whose data features are all required features in the same field or form.

In an embodiment, the analysis module 122 converts the interface data into data in Json format, and the analyzing module 122 outputs the interface data in Json format into the rendering module 124. In step S240, the rendering module 124 displays interface content on a display according to serialized the interface data. In an embodiment, the rendering module 124 calls a corresponding API among the APIs according to the configuration data and then obtains corresponding calling data. To be specific, the rendering module 124 may automatically obtain data meeting user's needs from the corresponding API according to the setting/configuration data and then provides a data interface for the user to perform operations and queries (such as the query of the quantity of the submitted purchase order, the query of material inventory, etc.).

Figure 4:
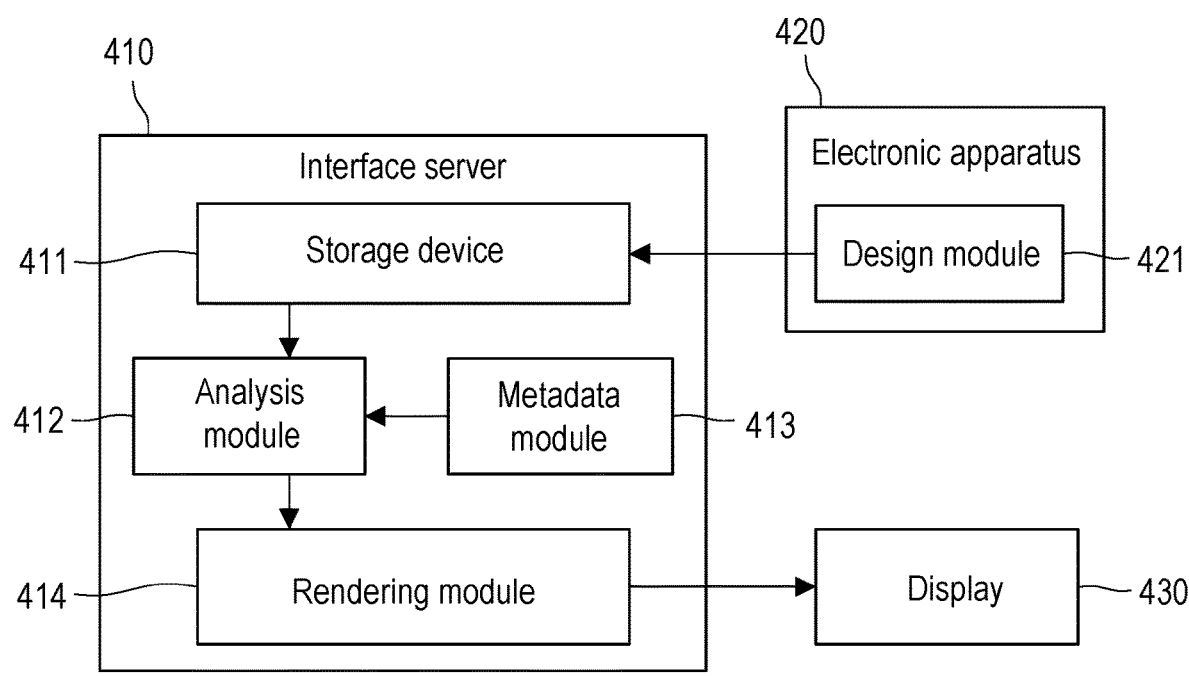
FIG. 4 is a schematic view of an interface server, an electronic apparatus, and a display according to an embodiment of the disclosure.

FIG. 4 is a schematic view of an interface server, an electronic apparatus, and a display according to an embodiment of the disclosure. The interface generation system 100 includes an electronic apparatus 420 and an interface server 410. A design module 421 is disposed in the electronic apparatus 420, and an analysis module 412, a metadata module 413, and a rendering module 414 are disposed in the interface server 410. The electronic apparatus 420 may be, for example, a personal computer (PC), a tablet computer, or a server, etc., with computing functions to be connected to the interface server 410. The interface server 410 includes a storage device 411, an analysis module 412, a metadata module 413, and a rendering module 414. The storage device 411 is coupled to the design module 421 and the analysis module 412. The metadata module 413 is coupled to the analysis module 412. The rendering module 414 is coupled to the analysis module 412 and a display 430. In this embodiment, the coupling between various modules and devices may be implemented through transceivers, and the disclosure is not limited thereto. In this embodiment, the design module 421, the storage device 411, the analysis module 412, the metadata module 413, and the rendering module 414 may be matched with corresponding data transmission interfaces and/or data processing modules to implement their respective functions through corresponding software and/or programs.

In this embodiment, each of the interface server 410 and the electronic apparatus 420 includes a processing unit and a storage unit. The processing unit may include, for example, a central processing unit (CPU) or a programmable microprocessor for general or special use, a digital signal processor (DSP), an application specific integrated circuit (ASIC), a programmable logic device (PLD), other similar processing circuits, or a combination of the foregoing devices. The storage device (120 and 411) may be a memory, such as a non-volatile memory (NVM). The storage device (120 and 411) may store related programs, units, modules, or algorithms for the processing unit to access and execute, so as to implement the related functions and operations described in the various embodiments of the disclosure.

In this way, the interface server 410 and the electronic apparatus 420 (e.g., the user operation interface) may effectively establish an operation interface related to the API in the configuration data and a data logic processing service (e.g., querying, integrating, changing, deleting, adding, comparing, sorting, etc.) through the configuration data inputted by the user. More importantly, the interface server 410 may effectively establish the operation interface according to the configuration data. It does not require the user to have front-end development skills, nor does it need to be developed through a designing device, and the screen (i.e., the operation interface or data table) may be automatically generated. The efficiency and practicality of interface generation are thereby improved.

Figure 5:
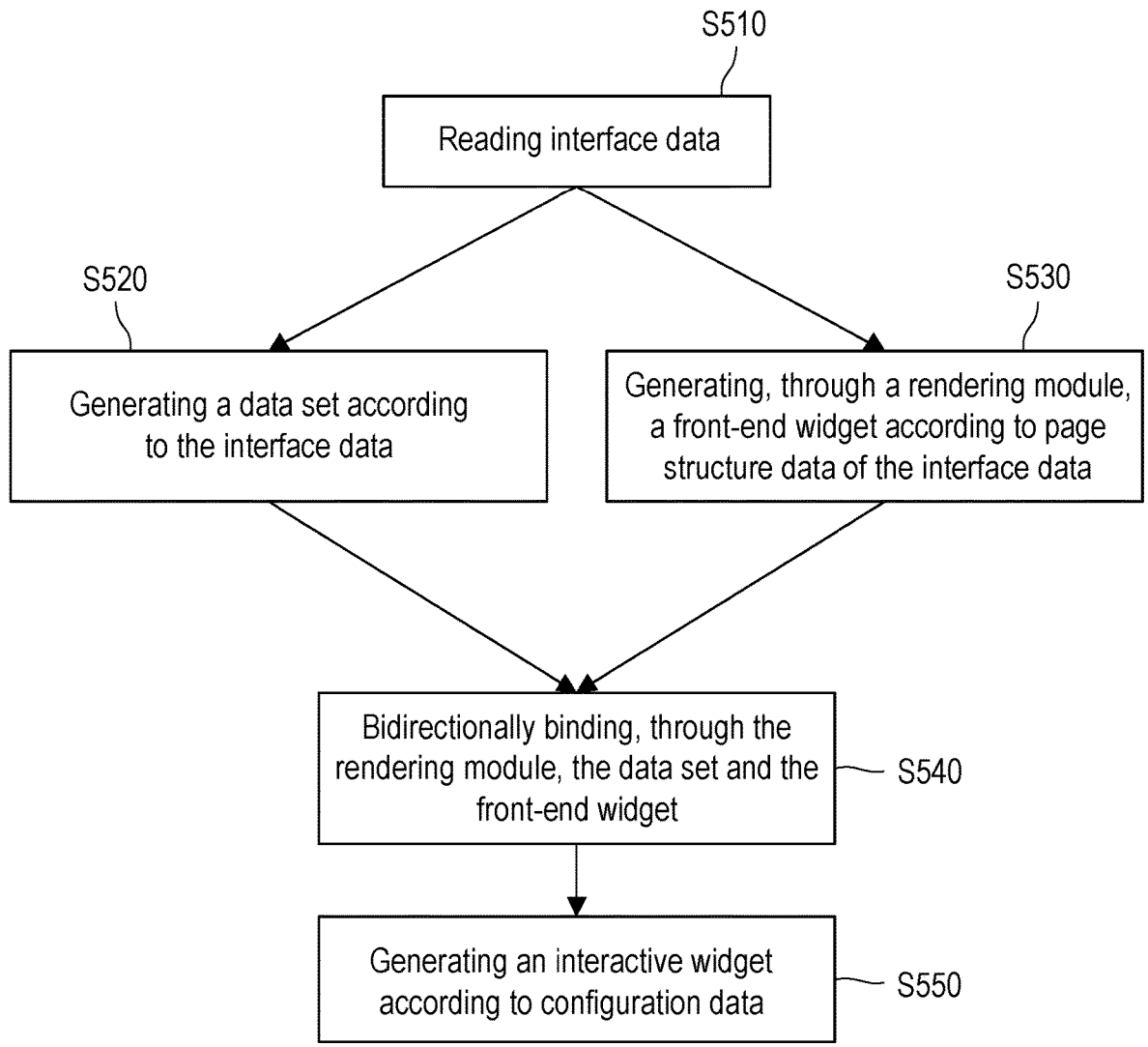
FIG. 5 is a flow chart of interface analysis and generation according to an embodiment of the disclosure.

FIG. 5 is a flow chart of interface analysis and generation according to an embodiment of the disclosure. With reference to FIG. 4 and FIG. 5, the interface generation system 100 may execute the following steps S510 to S550 to continue the abovementioned process of the rendering module 414 analyzing the interface data and generating the interface content. In step S510, the rendering module 414 reads the interface data. In step S520, the rendering module 414 generates a data set according to the interface data. To be specific, the rendering module 414 generates the data set and page structure data according to the interface data. The data set is a collection of multiple pieces of data, and the data comes from the data queried by the design module 421 according to the configuration data. It is worth noting that the data set does not have a fixed structure and only needs to correspond to the page structure data to generate the interface content. The page structure data is generated according to the metadata, and the page structure data can generate different controls/widgets.

In step S530, the interface server 410 generates, through the rendering module 414, a front-end widget according to the page structure data of the interface data. To be specific, the rendering module 414 generates the corresponding front-end widget according to the page structure data. The front-end widget is a functional widget displayed on the display 430 and then executes corresponding processing logic (such as searching for purchase requisition data) according to parameters or instructions inputted by the user. The page structure data may include a data operation, data processing logic, a processing rule, a request instruction, a data arrangement rule, and other settings related to presenting data and arranging tables.

In step S540, the interface server 410 bidirectionally binds, through the rendering module 414, the data set and the front-end widget. To be specific, the rendering module 414 bidirectionally binds the data set and the front-end widget, so that the data set may change correspondingly with the adjustment of the front-end widget. In other words, when the user adjusts and modifies the interface content by operating the interface on the display 430, the corresponding data set stored in the storage device 411 may also change accordingly. Similarly, when the data of the data set changes, the data or format on the corresponding front-end widget may also change. In an embodiment, when the user operates the widget and then changes the data in the widget, the processor may give real-time feedback to the user according to the user's operation (such as refreshing the page regularly and providing the latest data).

In step S550, the rendering module 414 generates an interactive widget according to the configuration data. To be specific, the rendering module 414 generates other front-end widgets (e.g., button widget and menu widget) according to the configuration data. The rendering module 414 generates the interactive widget according to the submitted data in the configuration data and binds the interactive widget and the submitted data. The submitted data may be data that calls different APIs at the same time and is presented in the same event. The submitted data may also be a plurality of processing logic or data fields that are parallel and do not interfere with each other. The submitted data may be data obtained from the API according to the configuration data. For instance, if the submitted data includes the inventory quantity of an object A, the processor may call the inventory quantity of the object A according to the API related to the inventory in the configuration data. In this way, the submitted data may perform further logical processing on the inventory quantity of the object A.

In an embodiment, the rendering module 414 displays the front-end widget and the interactive widget on the display 430. The interactive widget may be a functional widget such as a basic data input field, a pop-up window data selection field, and a required data input window. Therefore, in this embodiment, the interface generation system 100 may provide effective and easy operation related to the configuration of the API and the generation of the operation interface. It is worth noting that the processor may determine whether the data or field is required according to the data feature (e.g., metadata) bound to the front-end widget and the interactive widget. In other words, when a required field (widget) is not filled, the interface displays "Unable to submit", and the next step (such as submitting data or calculating values) cannot be performed.

In view of the foregoing, in the interface generation system and the interface generation method provided by the disclosure, the corresponding operation interface may be effectively established and generated according to the configuration data inputted by the user. Further, in the interface generation system and the interface generation method provided by the disclosure, the corresponding data interface may be established according to each calling operation of the API service when the user operates the interface. Further, the data and widgets generated by the related calling operations may be sorted to generate an operation interface that conforms to the user's settings. In this way, the interface generation system and the interface generation method provided by the disclosure can provide users with a convenient and efficient interface generation function. In other words, the functions and effects implemented by the interface generation system and the interface generation method provided by the disclosure can improve the development and operation convenience of the interface.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. An interface generation system, comprising:
a storage device configured to store a design module, an analysis module, a metadata module, and a rendering module; and
a processor coupled to the storage device and configured to execute the design module, the analysis module, the metadata module, and the rendering module,
wherein the processor executes the design module, so that the design module receives configuration data,
the processor executes the metadata module, so that the metadata module stores metadata of a plurality of application programming interfaces according to the configuration data,
the analysis module analyzes the configuration data and the metadata to generate interface data, and the rendering module displays an interface on a display according to the interface data, wherein the rendering module generates a data set and page structure data according to the interface data, wherein the rendering module generates a front-end widget according to the page structure data of the interface data, and the rendering module bidirectionally binds the data set and the front-end widget, thereby changing the data set correspondingly with an adjustment of the front-end widget, and the rendering module displays the front-end widget on the display.

2. The interface generation system according to claim 1, wherein the configuration data is related to a name, a type, request content, and an extraction rule of at least one of application program interfaces, wherein the design module calls a corresponding application program interface among the application program interfaces according to submitted data in the configuration data and then obtains corresponding response information.

3. The interface generation system according to claim 1, wherein the rendering module calls a corresponding application program interface among the application program interfaces according to the configuration data and then obtains corresponding calling data.

4. The interface generation system according to claim 1, wherein the rendering module generates an interactive widget according to submitted data in the configuration data and binds the interactive widget and the submitted data.

5. The interface generation system according to claim 1, wherein the analysis module serializes the interface data and outputs a serialized interface data to the rendering module.

6. The interface generation system according to claim 1, further comprising an electronic apparatus and an interface server, wherein the design module is disposed in the electronic apparatus, and the analysis module, the metadata module, and the rendering module are disposed in the interface server.

7. The interface generation system according to claim 1, wherein the processor calls the plurality of application programming interfaces according to the configuration data and then obtains the metadata, and the metadata module stores the metadata, wherein the metadata comprises a data name, a data type, and a data feature.

8. An interface generation method, comprising:

receiving, through a design module, configuration data;

storing, through a metadata module, metadata of a plurality of application programming interfaces according to the configuration data;

analyzing, through an analysis module, the configuration data and the metadata to generate interface data;

displaying, through a rendering module, interface content on a display according to the interface data;

generating, through the rendering module, a data set and page structure data according to the interface data;

generating, through the rendering module, a front-end widget according to the page structure data of the interface data;

bidirectionally binding, through the rendering module, the data set and the front-end widget, thereby changing the data set correspondingly with an adjustment of the front-end widget; and displaying, through the rendering module, the front-end widget on the display.

9. The interface generation method according to claim 8, further comprising:

calling, through the design module, a corresponding application program interface among application program interfaces according to submitted data in the configuration data and then obtaining corresponding response information, wherein the configuration data has a name, a type, request content, and an extraction rule related to at least one of the application program interfaces.

10. The interface generation method according to claim 8, further comprising:

calling, through the rendering module, a corresponding application program interface among application program interfaces and then obtaining corresponding calling data.

11. The interface generation method according to claim 8, wherein the step of displaying, through the rendering module, the interface content on the display according to the interface data further comprises:

generating, through the rendering module, an interactive widget according to submitted data in the configuration data and binding the interactive widget and the submitted data.

12. The interface generation method according to claim 8, wherein the step of analyzing, through the analysis module, the configuration data and the metadata to generate the interface data further comprises:

serializing, through the analysis module, the interface data; and outputting, through analysis module, a serialized interface data to the rendering module.

13. The interface generation method according to claim 8, wherein the design module is disposed in an electronic apparatus, and the analysis module, the metadata module, and the rendering module are disposed in an interface server.

14. The interface generation method according to claim 8, wherein the step of storing, through the metadata module, the metadata of the plurality of application programming interfaces according to the configuration data further comprises:

calling, through a processor, the plurality of application programming interfaces according to the configuration data and then obtaining the metadata; and storing, through the metadata module, the metadata, wherein the metadata comprises a data name, a data type, and a data feature.

\* \* \* \* \*